United States Patent [19]

Allton et al.

[11] Patent Number: 4,842,223
[45] Date of Patent: Jun. 27, 1989

[54] HATCH COVER

[75] Inventors: Charles S. Allton, Houston; James H. O'Kane, Friendswood, both of Tex.

[73] Assignee: The United States of America as represented by the Administrator of the National Aeronautics and Space Administration, Washington, D.C.

[21] Appl. No.: 165,956

[22] Filed: Mar. 9, 1988

[51] Int. Cl.⁴ .............................................. B64G 1/22
[52] U.S. Cl. ................... 244/158 R; 49/253; 114/112; 114/201 R; 244/129.5
[58] Field of Search ............ 244/129.4, 129.5, 158 R, 244/159, 162, 163; 114/116, 117, 118, 119, 176, 178, 201 R, 320, 335; 404/25; 49/41, 68, 226, 247, 246, 253, 254, 465; 128/205.26

[56] References Cited

U.S. PATENT DOCUMENTS

| 95,938 | 10/1869 | Safford . | |
|---|---|---|---|
| 2,136,289 | 11/1938 | Edwards | 189/64 |
| 2,156,110 | 4/1939 | Brukner | 244/129 |
| 2,363,454 | 11/1944 | Witkin | 312/189 |
| 2,448,546 | 9/1948 | Plemel et al. | 128/205.26 |
| 2,480,692 | 8/1949 | Anthony | 244/129 |
| 2,562,551 | 7/1951 | Henderson | 49/253 |
| 2,926,012 | 2/1960 | Maher | 244/162 |
| 3,144,219 | 8/1964 | Schnitzer | 114/116 |
| 3,312,017 | 4/1967 | Witherspoon et al. | 114/119 |

FOREIGN PATENT DOCUMENTS

| 705897 | 5/1941 | Fed. Rep. of Germany . | |
| 2396862 | 3/1979 | France . | |
| 11574 | of 1895 | United Kingdom | 114/178 |

Primary Examiner—Sherman D. Basinger
Assistant Examiner—Thomas J. Brahan
Attorney, Agent, or Firm—Russell E. Schlorff; John R. Manning; Edward K. Fein

[57] ABSTRACT

A hatch cover system including an ellipitcal port opening (12) in a housing (10) and an elliptical cover member (18) supported centrally by a rotational bearing (53) for rotation about a rotational axis (54) normal to the cover member and by pivot pins (57,62) in a gimbal member (24) for pivotal movement about axes (56 and 58) perpendicular to the rotational axis. Arm members (26,28) support the gimbal member (24) pivotally by pivot members (30,31) so that upon rotation and manipulation the cover member (18) can be articulately moved from a closed position on the port opening to an out of the way position with a minimum of volume sweep by the cover member (18).

12 Claims, 2 Drawing Sheets

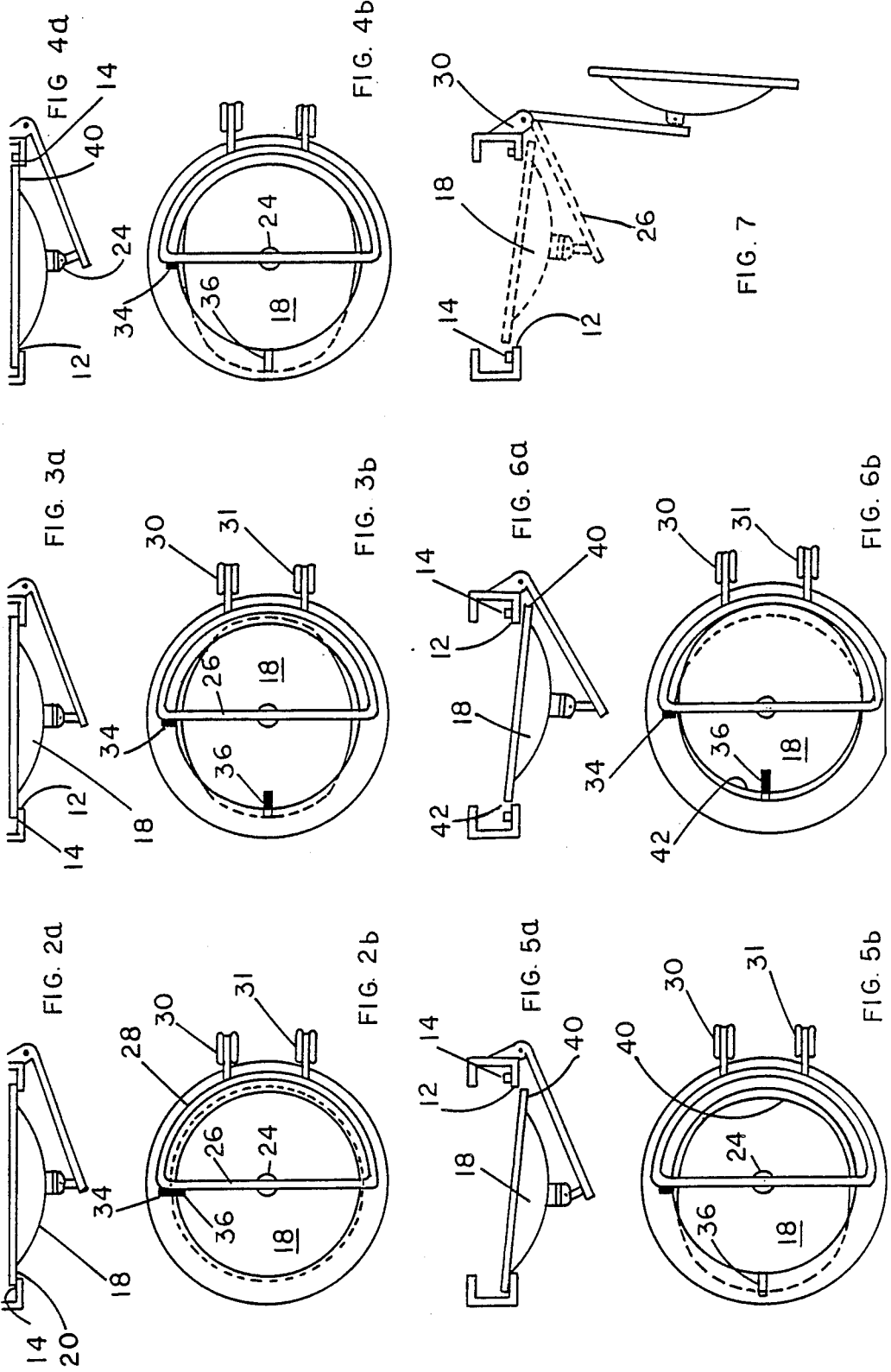

HATCH COVER

ORIGIN OF THE INVENTION

The invention described herein was made by employees of the United States Government and may be manufactured and used by or for the Government of the United States of America for governmental purposes without the payment of any royalties thereon or therefore.

FIELD OF THE INVENTION

This invention relates to a hatch construction for a port, and more particularly to a hatch construction for a space vehicle where the hatch construction has a low volume sweep and can be easily manipulated from either side of the hatch.

BACKGROUND OF THE INVENTION

In the prior art:

U.S. Pat. No. 95,938 discloses an oval or elliptically shaped door member which is pivoted about a transverse axis and when opened intersects and presents an obstruction in the flow path through the opening.

U.S. Pat. No. 2,136,289 discloses a circularly shaped window constructed with two half disc segments where one of the segments is rotatable in a casing frame. The window is not intended to function as a hatch closure member.

U.S. Pat. No. 2,156,1.() discloses a cover for use with a thin material where a cover plate utilizes spring members to retain the cover plate in an opening. This is a snap type of cover.

U.S. Pat. No. 2,363,454 discloses a cabinet with an elongated frame opening. A circular door member rolls into and out of a closing position with respect to an opening.

U.S. Pat. No. 2,480,692 discloses a cover which utilizes notches for release of a cover plate in a given rotative position of the cover plate and springs for retaining the cover plate in an opening.

German Pat. No. 705,897 issued May 13, 1941 discloses a segment window construction in which manipulation of a member can be employed to remove a segment from a seated condition through an opening.

French Pat. No. 2,396,862 issued July 5, 1977 shows a removable door structure which has manipulation space available to remove the door.

Previous hatches used in space vehicles were either closed in a semi permanent way or closed with a mechanism that forced the hatch against its seals. The semi permanent approach did not provide the capability to quickly open or close the hatch since around their perimeter they contained a series of bolt type fasteners that had to be actuated individually and prevented the hatch from being realistically opened by a crewman on the opposite side. The hatches that were closed with a mechanism were very elaborate in that the systems consisted of a large number of mechanical linkages all activated simultaneously to move levers around the periphery of the hatches. This mechanism had to be operable from either side of the hatch which required a penetration of the hatch with a moving part that required positive sealing at the penetration.

The proposed hatch does not have any moving latches or levers, or penetrations with moving parts,, requiring seals, in that it uses the pressure differential across the hatch to force the hatch against its "O" ring seals. The lip seal acts as a gas barrier during pressurization which forces the hatch against the mating "O" ring sealing surfaces. This hatch can be used to seal against a pressure differential in either direction since it is designed to seal on either side partially reducing the number of hatches required. It is also operable from either side by a single person and cannot be opened with a pressure across it where others have this potential hazard. Since this design consists of few parts its recurring cost potentially less and its reliability is greater than the mechanically actuated earlier designed hatches. It is also more versatile than the fixed hatches in that it allows the crewman to operative it quickly.

This hatch design has the additional advantage as an Extra Vehicular Hatch of opening outward and yet using internal vehicular pressure to force it to seal. By opening outward it requires practically no internal sweep volume there by allowing the airlocks to be shorter reducing depressurization/repressurization times. this reduces crew idle time and pumping power requirements.

THE PRESENT INVENTION

The present invention is embodied in a hatch system where the hatch cover is arranged to seal inwardly of an internal flange so that internal pressure assists the sealing of the hatch cover on the internal flange. The shape of the internal flange and hatch cover are elliptical or oval in configuration. The hatch cover is rotatably supported on a gimbal coupling centrally of the hatch cover. The gimbal coupling is attached to a frame means which is pivotally connected to the housing for the hatch port.

The rotative connection to the hatch cover permits rotation of the hatch cover to an opening position where the long axis of the elliptical hatch cover is transverse to the long axis of the elliptical hatch port or opening. In this position, the hatch cover can be shifted and then tilted relative to the hatch port by the operation of the gimbal coupling to pass the hatch cover from a transverse position within a housing to a position external of the hatch port. When the hatch cover is located external to or outside of the housing, the frame and hatch cover can be pivoted out of a blocking position to leave the hatch port full opening. The hatch cover can be opened or closed from either side by use of handholds and does not require release of handholds during the opening or closing operation.

DESCRIPTION OF THE DRAWINGS

FIGS. 2a and 2b are respectively top and front views of a hatch cover in a closed position;

FIGS. 3a and 3b are respectively top and front views of a hatch cover rotated counterclockwise 90° from the position shown in FIGS. 2a and 2b.

FIGS. 4a and 4b are respectively top and front views of a hatch cover shifted to the left from the position shown in FIGS. 3a and 3b;

FIGS. 5a and 5b are respectively top and front views of a hatch cover tilted 5° with repsect to a vertical axis and from the position shown in FIGS. 4a and 4b;

FIGS. 6a and 6b are respectively top and front views of a hatch cover shifted to the right from the position shown in FIGS. 5a and 5b;

FIG. 7 is a top view of a hatch cover rotated counterclockwise from a hatch port.

DESCRIPTION OF THE PRESENT INVENTION

Figure 1:
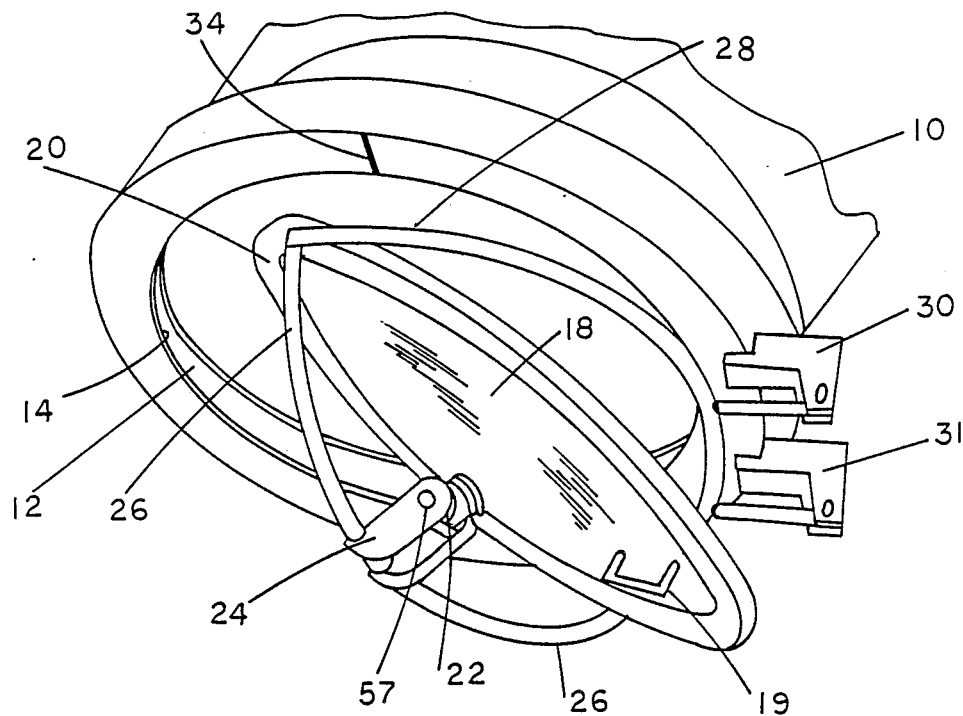
FIG. 1 is a perspective view of a hatch cover system embodying the present invention.

Referring now to FIG. 1, a housing 10 has a hatch port 12 with an internal sealing surface 14. The hatch port or opening is elliptically shaped with a long axis being located on vertical plane (see FIG. 2b) An elliptically shaped hatch cover 18 with an annular flange 20 is adapted to be received within the housing 10 arranged to seal with respect to the internal sealing surrface 14. The hatch cover 18 is rotatively supported at a center location by a rotational coupling 22. The rotational coupling 22 is attached to a gimbal or double pivoting link 24, which provides translation and pivoting about spaced apart and parallel axes. The gimbal 24 is attached to a vertically arranged support bar members 26. The support bar members 26 extend to locations above and below the upper and lower edges of the hatch cover 18 and is attached to a semicircular support bar member 28. The curvature of the bar member 28 is sized so that the hatch cover 18 can be rotated about spaced apart pivot axes in the gimbal support 24 without contacting the bar member 28. The bar member 28 is pivotally mounted to one side of the housing 10 by spaced apart supports 30, 31 where the pivot axes of the supports 30, 31 are parallel to the pivot axes in the gimbal support 24. Thus the bar member 28 and the hatch cover 18 are pivotally and rotatively mounted so that the hatch cover can be translated laterally and pivotally moved relative to the hatch port 12.

As can be seen in FIG. 1, the hatch cover 18 is mounted to and guided by a swing arm assembly which comprises the pivoted curved bar member 28 rigidly joined to two bowed straight bar members 26 which, in turn, are joined to the pivoting link 24 on the axial centerline of the hatch cover 18. The link 24 is double jointed (see FIG. 8) to permit the hatch cover 18 to be moved in side-to-side translation to clear the port opening 12 as well as to be then doubly pivoted about the axes of link 24 while swing arm assembly rotated outward about its hinge attached points 30, 31. This permits the hatch cover 18 to pass through the arm member 28 resulting in reduced sweep volume during opening and closing.

Previously used space vehicle hatches have been hinged at an edge which forces their opening and closing swept volume to be large and where used internal to a vehicle results in a space dedicated to accommodate this motion.

It is contemplated that the hatch will be used in hatchways for the proposed Space Station with one particular use being the air locks used for extra vehicular egress of crewmen.

Referring now to FIG. 2a through FIG. 7b, a diagrammed illustration of the functioning of opening the hatch cover from a closed position is illustrated. In FIG. 2a the hatch cover 18 is shown with the sealing flange 20 in a sealing relationship (by any suitable means) with the internal sealing surface or flange 14. The front view, FIG. 2b shows the hatch cover 18 in closed position with a mark 34 on the housing in alignment with a mark 36 on the hatch cover 18. The bar members 26, 28 are shown connected to the hinges 30, 31 on the housing and to the hatch cover 18.

To open the hatch port, the hatch cover 18 is rotated by hand holds 19 to a position 90° counterclockwise (by virtue of the rotative mounting in gimbal 24) thereby moving the hatch cover mark 36 to a 90° position where the long axis of the elliptical hatch cover 18 lies in a horizontal plane and the short axis of the elliptical hatch cover is vertical. From the hatch cover position shown in FIGS. 3a and 3b, the pivoting action of gimbal 24 permits the hatch cover 18 to be shifted to the left relative to the hatch port 12 so that one horizontally located edge portion 40 of the hatch cover (FIG. 4a) clears the hatch port or opening 12. When the edge portion 40 clears the hatch opening 12, the gimbal 24 permits the hatch cover 18 to be tilted about vertical axes of the gimbal 24 and moved to displace the edge 40 to a location forwardly or outwardly of the port opening 12 as shown in FIG. 5a. From the hatch cover position shown in FIG. 5a, the hatch cover 18 can be shifted by pivoting action of gimbal 24 to the right thereby displacing a diametrically located horizontal edge portion 42 to a position where the hatch cover 18 can be removed from the inside of the hatch port 12 to a location outside of the hatch port 12. Thus, as shown in sequential positions in FIG. 7, the hatch cover 18 can be moved about the pivot supports 30, 31 and the pivot axes in the gimbal 24 to a location completely out of the way of the hatch port 12.

Figure 8:
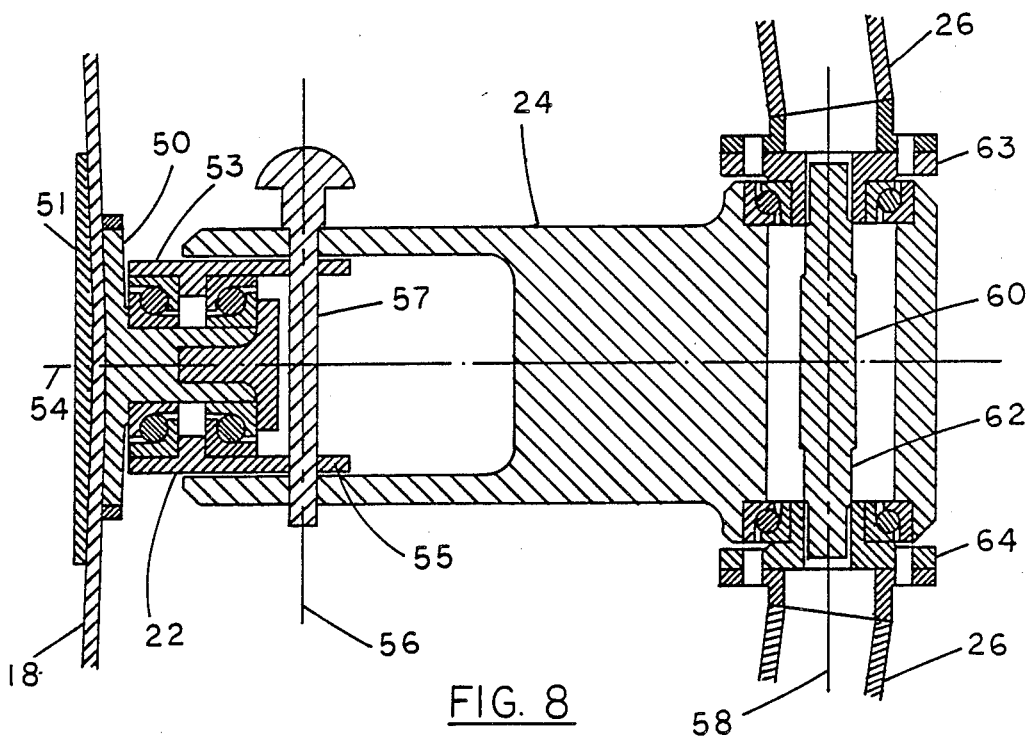
FIG. 8 is a view in vertical cross-section of the gimbal and rotative coupling.

FIG. 8 illustrates a hatch cover 18 centrally located and attached to a face plate 50 by a back plate 51 and suitable attaching means (not shown). The face plate 50 is rotatively mounted in a bearing means 53 for rotation about an axis 54 which is a central axis for the hatch cover 18. The bearing means 53 includes an outer housing member 55 which is pivotally received in a yoke of the gimbal support 24 where a quick release pivot pin 57 has a pivot axis intersecting and perpendicular to the axis 54 and where the axis of the pivot pin 57 is parallel to the axis of the pivots in the hinges 30, 31. The quick release pin 57 can be pulled out of gimbal 24 to permit manual manipulation. At the other end of the elongated gimbal 24 is a pivot means 60 which includes upper and lower ball bearing supports for a pivot pin 62 and where the pivot pin 62 is connected by flange means 63, 64 to connecting ends on the support members constituting the support bar member 26. Accordingly, the hatch cover 18 can rotate with the swing arm assembly by virtue of the hinges 30, 31 and can pivot about the axis 56 and the axis 58, as well as rotate about the axis 54. This permits the elliptical hatch cover 18 to be rotated to place the longer axis in line with the shorter axis of the hatch opening 18, then translated or moved laterally to permit one edge of the hatch cover to clear the opening 12, then pivoted to move such edge out of the opening, then translated or moved laterally in a second direction and as the swing arm assembly swings out, move through the curved arms to a stowed position. All this occurs more or less simultaneously in apparent motion.

It will be apparent to those skilled in the art that various changes may be made in the invention without departing from the spirit and scope thereof and therefore the invention is not limited by that which is enclosed in the drawings and specifications, but only as indicated in the appended claims.

We claim:

1. A hatch cover system for opening and closing a hatch port in a housing while minimizing the effects of moving a hatch cover between open and closed positions including:

housing means having a non-circular hatch port, said hatch port having a orthogonally arranged long opening axis and a short opening axis where the intersection of said long and short opening axes defines a central point for said hatch port;

a non-circular hatch cover member having a orthogonally arranged long cover member axis and a short cover member axis where the intersection of said long and short cover member axes define a central location for said hatch member;

hatch cover support means for rotatively supporting said hatch cover member relative to said housing means whereby said hatch cover member can be rotated about a rotational axis at said central location when said central location is aligned with said central point for rotation between a closed position relative to said hatch port where said long and short opening axes are in generally alignment with said long and short cover member axes and an opening position where said hatch port has its long and short opening axes angularly displaced relative to said long and short cover member axes;

means for transversely translating said hatch cover support means in the plane of a hatch port, whereby the rotated hatch cover can be moved laterally so that one edge of the hatch cover is displaced from an edge of the hatch port;

means for tilting said hatch cover through the hatch port after the hatch cover has been rotated and translated transversely; and pivot means for pivotally mounting said hatch cover support means relative to said housing means for swinging said hatch cover about axes disposed parallel to said long opening axis after said the trailing edge of hatch cover has cleared the hatch port by being transversely translated.

2. The hatch cover system as defined in claim 1 wherein said hatch port and said hatch cover members have corresponding elliptical configurations, said pivot means including an arcuate frame member pivotally attached at a central location to said housing means and having end portions attached to crossbar members where said crossbar members extend to said central location and where said crossbar members are pivotally attached to said hatch cover support means.

3. The hatch cover system as defined in claim 2 wherein said pivotally attached frame member and said crossbar members are pivoted about axes which are parallel to said long opening axis.

4. The hatch cover system as defined in claim 3 wherein said rotational and pivot means includes a rotational bearing member attached to said hatch cover member and includes a support arm pivotally coupled to said bearing member and pivotally coupled to said central support arm members so that said hatch cover member is rotationally and pivotally articulate with respect to said support means.

5. The hatch cover system as defined in claim 4 wherein said semi-circular arm member has a curvature and configuration to permit said hatch cover member to be pivoted to either side of said semi-circular arm member.

6. The hatch cover system as defined in claim 5 where in said hatch cover and hatch port have seal means about the periphery thereof to establish a seal.

7. A hatch cover in a space vehicle system for opening and closing a hatch port in a housing of a space vehicle including:

a space vehicle having a housing, said housing having a non-circular opening defined by orthogonal long and short opening axes;

a hatch cover member having a non-circular configuration defined by orthogonal long and short member axes, said hatch cover member being adapted to sealingly engage an internal peripheral wall surface about said non-circular opening;

support means pivotally coupled to one side of the outside of said housing means for pivotal movement about an axis parallel to said long opening axis, said support means including a semicircular arm member pivoted at a central location to the housing means and central support arm members connected to the ends of said semicircular arm member, said arm members defining a "D" shaped configuration; and gimbal means having a first end pivotally coupled to a central location of said central support arm member and a second end pivotally and rotationally coupled to a central location on said hatch cover member for rotating for transversely translating and for pivoting said hatch cover member relative to said opening.

8. The hatch cover system as defined in claim 7 wherein said rotational and pivot means includes a rotational bearing member attached to said hatch cover member and includes a support arm pivotally coupled to said bearing member and pivotally coupled to said central support arm members so that said hatch cover member is rotationally and pivotally articulate with respect to said support means.

9. The hatch cover system as defined in claim 8 wherein said semi-circular arm member has a curvature and configuration to permit said hatch cover member to be pivoted to either side of said semi-circular arm member.

10. The hatch cover system as defined in claim 9 wherein said hatch cover has hand hold means attached to said cover member.

11. The hatch cover system as defined in claim 10 wherein said hatch cover and hatch opening have seal means about the periphery of thereof to establish a seal.

12. A method for opening and closing a hatch port in a housing while minimizing the effects of moving a hatch cover between open and closed positions wherein a housing means having a non-circular hatch port, said hatch port having a perpendicularly an orthogonally arranged long opening axis and a short opening axis where the intersection of said long and short opening axes defines a central point for said hatch port; a non-circular hatch cover member having perpendicularly an orthogonally arranged long cover member axis and a short cover member axis where the intersection of said long and short cover member axes define a central location for said hatch member; said method comprising the steps of:

rotatively supporting said hatch cover member relative to said housing whereby said hatch cover member can be rotated about a rotational axis at said central location when said central location is aligned with said central point for rotation between a closed position relative to said hatch port where said long and short opening axes are in generally alignment with said long and short cover member axes and an opening position where said hatch port has its long and short opening axes angularly displaced relative to said long and short cover member axes;

transversely translating said angular rotated hatch cover member inside the housing in the plane of the hatch port, whereby one edge of the hatch cover is clear of the wall of the opening of the hatch port;

tilting the translated hatch cover member whereby the edge of the hatch cover member extends through the opening of the hatch port and externally of the housing;

transversely translating said tilted hatch cover member until the trailing edge of the hatch cover member clears the hatch port; and pivoting said hatch cover member relative to the outside of said housing about an axis disposed parallel to said long opening axis whereby the hatch cover member substantially clears said hatch port.

* * * * *